United States Patent
McCall et al.

(10) Patent No.: US 8,164,421 B2
(45) Date of Patent: Apr. 24, 2012

(54) ADAPTIVE REMOTE VERIFICATION OF VEHICULAR FUNCTIONS

(75) Inventors: Clark E. McCall, Ann Arbor, MI (US); David T. Proefke, Madison Heights, MI (US); William A. Biondo, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 859 days.

(21) Appl. No.: 12/242,987

(22) Filed: Oct. 1, 2008

(65) Prior Publication Data

US 2010/0079235 A1 Apr. 1, 2010

(51) Int. Cl.
*H04Q 1/30* (2006.01)

(52) U.S. Cl. ............... 340/7.62; 340/426.16; 340/425.5; 340/3.9

(58) Field of Classification Search .................... 340/3.9, 340/425.5, 426.16, 7.62; 455/567, 563, 41.2, 455/550.1; 379/392.01, 388.03
See application file for complete search history.

(56) References Cited

U.S. PATENT DOCUMENTS

| | | | |
|---|---|---|---|
| 6,134,455 A * | 10/2000 | Corkum | 455/567 |
| 6,954,657 B2 * | 10/2005 | Bork et al. | 455/567 |
| 7,333,604 B2 * | 2/2008 | Zernovizky et al. | 379/392.01 |
| 8,005,473 B2 * | 8/2011 | Zeinstra et al. | 455/425 |
| 2009/0115639 A1 * | 5/2009 | Proefke et al. | 340/989 |

OTHER PUBLICATIONS

"Prius 2007 Pocket Reference Guide" (Toyota Inc., MN 00452-PRG07-PRI, Printed Jul. 2006.*

* cited by examiner

*Primary Examiner* — Benjamin C Lee
*Assistant Examiner* — Peter Mehravari
(74) *Attorney, Agent, or Firm* — Ingrassia Fisher & Lorenz, P.C.

(57) ABSTRACT

Methods and apparatus are provided for generating a confirmation signal indicating that a vehicle function has been activated. The apparatus comprises an annunciator for generating the confirmation signal. A processor is coupled to the annunciator and is configured to store an annunciation profile that characterizes the confirmation signal as a function of at least one condition, and command the annunciator to generate the confirmation signal in accordance with the profile.

7 Claims, 3 Drawing Sheets

ADAPTIVE REMOTE VERIFICATION OF VEHICULAR FUNCTIONS

TECHNICAL FIELD appreciate

The present invention generally relates to Remote Function Activation (RFA) of vehicular features, and more particularly to a system for modifying an RFA confirmation feedback signal based on user preferences and/or ambient conditions, environmental conditions, and the like.

BACKGROUND OF THE INVENTION

The use of audible/optical confirmation of remotely activated vehicular features is well-known. For example, many operations that may be initiated using the controls of a keyfob are confirmed by simple audible (e.g., horn chirps or other high pitched signals) and/or optical (e.g., flashing exterior lights) feedback annunciation signals. Common among these RFA functions are Vehicle Lock and Unlock, Panic Alarm, Content Theft Deterrent, and Remote Start. In known systems, however, the type and intensity of the feedback signals are dependent solely on the selected function. That is, the type and/or intensity of the feedback annunciation (i.e., the feedback mode) is not influenced by ambient or environmental conditions, user preferences, etc. For example, the length or magnitude of an RFA horn chirp is the same regardless of the level of ambient noise in the vicinity of the vehicle. This might result in an inability on the part of a user to hear the chirp in a high ambient-noise environment. In contrast, a loud horn chirp in a low ambient-noise environment could be annoying.

Thus, there exists an ongoing need to provide an RFA annunciation system that selects a suitable confirmation annunciation in view of ambient or environmental conditions, user preferences, vehicle location, time of day, vehicle occupancy, and the like.

Other desirable features and characteristics will become apparent from the following detailed description and the appended claims, taken in conjunction with the accompanying drawings and the foregoing technical field and background

SUMMARY OF THE INVENTION

Methods and apparatus are provided for generating a confirmation signal indicating that a vehicle function has been activated. The apparatus comprises an annunciator for generating the confirmation signal. A processor is coupled to the annunciator and is configured to store an annunciation profile that characterizes the confirmation signal as a function of at least one condition, and command the annunciator to generate the confirmation signal in accordance with the profile.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-4 are merely illustrative and may not be drawn to scale.

Figure 1:
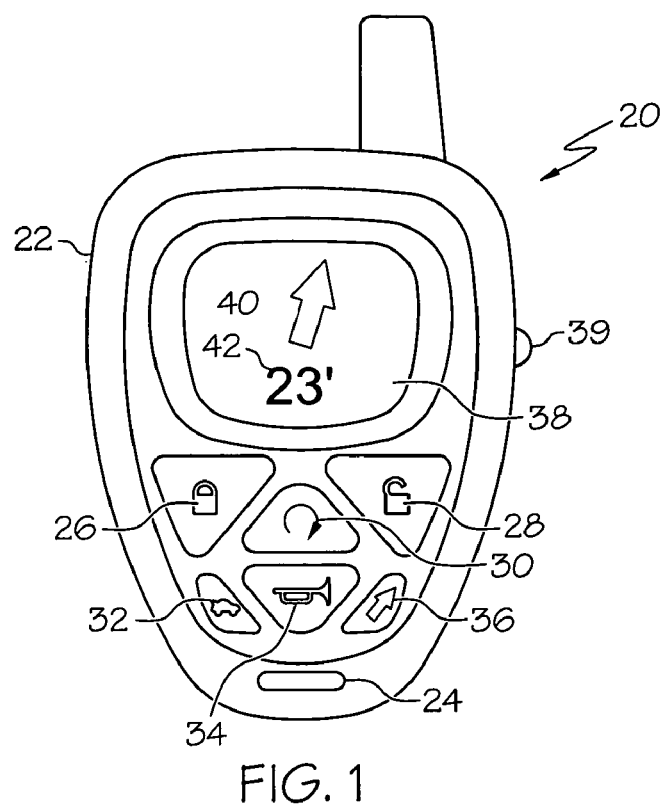
FIG. 1 is a plan view of a keyfob suitable for initiating certain exemplary vehicle features.

FIG. 1 is a plan view of a remote function transmitter (e.g., keyfob 20) comprising a housing 22 having an opening 24 therethrough that enables keyfob 20 to be attached to a keychain in the well-known manner. A plurality of buttons is provided on the exterior of housing 22 and may include, for example, a LOCK button 26, an UNLOCK button 28, a REMOTE START button 30, a TRUNK UNLOCK button 32, a PANIC button 34, and a FIND PARKED VEHICLE button 36. Keyfob 20 further comprises a display (e.g., a liquid crystal display) 38 that may display status information relating to a vehicle (or vehicles) associated with keyfob 20. This status information may include the vehicle's mileage, tire pressure, current fuel level, radio station settings, and door lock status. A scroll wheel 39 may be mounted on a side of housing 22 and utilized to navigate amongst such data. For example, a user may rotate scroll wheel 39 to navigate between vehicular features and depress scroll wheel 39 to select a desired feature and view status information associated therewith.

Figure 2:
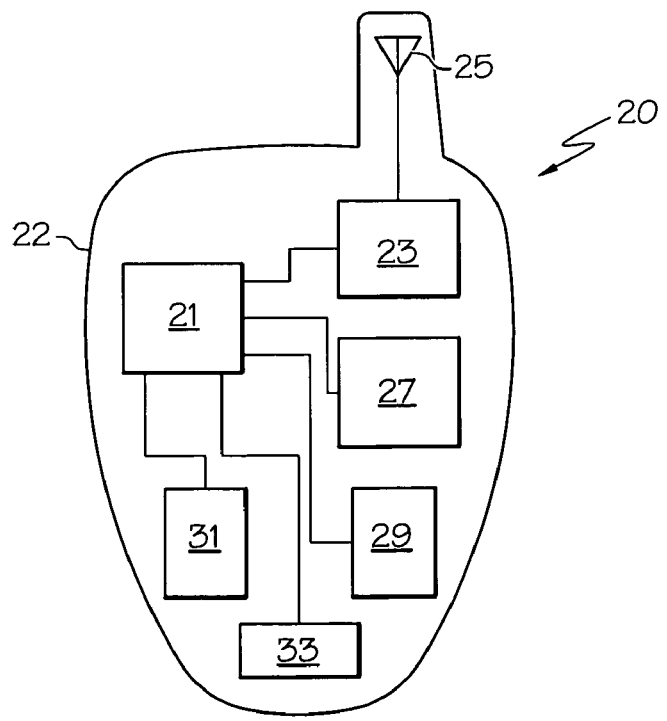
FIG. 2 is a block diagram illustrating the operational elements of the keyfob shown in FIG. 1.

Within housing 22, keyfob 20 includes a controller (or processor) 21, a transceiver 23 having an antenna 25, a GPS module 27, a user input interface 29, a display screen interface 31, and a battery 33, all of which are in operable communication as is well known and shown in FIG. 2.

Figure 3:
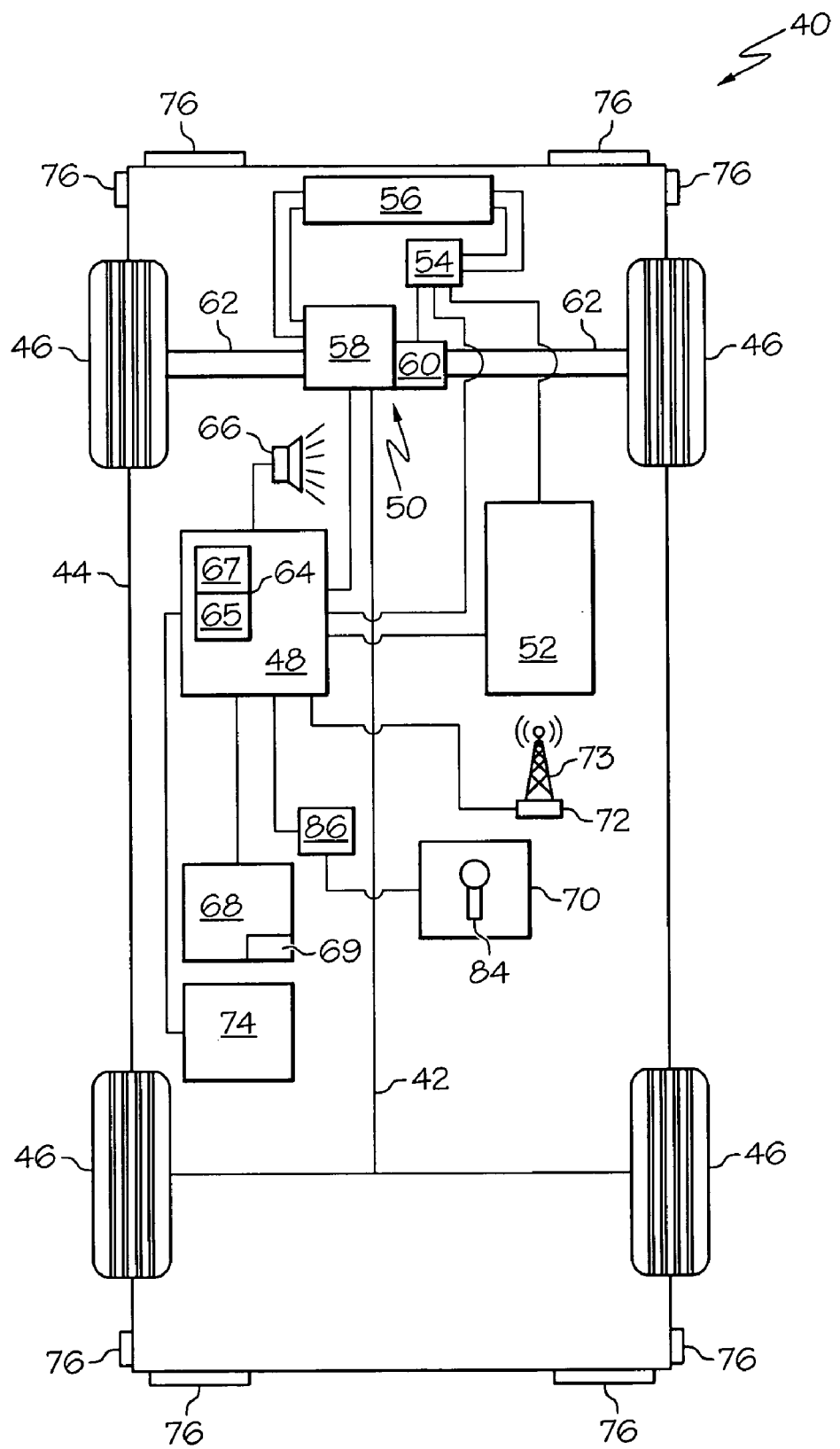
FIG. 3 is a plan view of a vehicle on which an exemplary system for modifying an RFA confirmation feedback signal may be deployed in accordance with an exemplary embodiment.

FIG. 3 is a plan view of a vehicle (e.g., an automobile 40) for use in conjunction with one or more embodiments of the present invention. The automobile 40 includes a chassis 42, a body 44, four wheels 46, and an electronic control system (or electronic control unit (ECU)) 48. The body 44 is arranged on the chassis 42 and substantially encloses the other components of the automobile 40. The body 44 and the chassis 42 may jointly form a frame. The wheels 46 are each rotationally coupled to the chassis 42 near a respective corner of the body 44.

The automobile 40 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The automobile 40 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 3, the automobile 40 may be a hybrid vehicle, and further includes an actuator assembly (or powertrain) 50, a battery 52, a power inverter (or inverter) 54, and a radiator 56. The actuator assembly 50 includes an internal combustion engine 58 and an electric motor/generator (or motor) system (or assembly) 60. Although not illustrated, the power inverter 54 may include a plurality of switches, or transistors, as is commonly understood. The electric motor system 60, in one embodiment, includes one or more sinusoidally-wound, three-phase alternating current (AC) motor/generators (or motors) (e.g., permanent magnet) such as commonly used in automotive vehicles (e.g., traction drive control systems, and the like).

Still referring to FIG. 3, the combustion engine 58 and the electric motor system 60 are integrated such that both are mechanically coupled to at least some of the wheels 46 through one or more drive shafts 62. The radiator 56 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 58 and the inverter 54. The inverter 54 receives and shares coolant with the electric motor 60. The radiator 56 may be similarly connected to the inverter 54 and/or the electric motor 60.

The electronic control system 48 is in operable communication with the actuator assembly 50, the battery 52, and the inverter 54. Although not shown in detail, the electronic control system 48 includes various sensors and automotive control modules, or electronic control units (ECUs), such as a body control module (BCM) 64, including at least one processor 67 and/or a memory 65 which includes instructions, customer preferences, and locator information stored therein (or in another computer-readable medium) for carrying out the processes and methods as described below.

The automobile 10 further includes an audible annunciator 66, a sensor assembly 70, a receiver 72, an antenna 73, a navigation database 74, a navigation system 68 such as a Global Positioning System (GPS) module including a clock 69, and various lights 76, all of which are connected to the frame (i.e., "onboard" the automobile 40) and in operable communication with the electronic control system 48. Annunciator 66 may be, for example, a horn, speaker, or the like. The GPS module 68 is also in operable communication with multiple GPS satellites in orbit around the Earth, and may include a processor and a separate antenna to communicate with the satellites to determine the location of the automobile 40. The sensor assembly 70 may include one or more sensors, such as a microphone 84, to detect ambient conditions around the automobile 40, such as the ambient noise level. A sound processor 86 is coupled between electronic control system 48 and microphone 84.

The antenna 73 is a transducer designed to transmit and/or receive electromagnetic waves (e.g., radio waves) in the well-known manner. The navigation database 74 includes navigation-related data such as maps, locations of landmarks and data related to different areas such as restricted noise areas.

The lights (or lamps) 76 are positioned on an outer portion of the body 44, and although not shown as such, are in operable communication with the electronic control system 48 (or the BCM 64). The lights 76 may include, for example, head lights on the front of the automobile 40, tail lights on the rear of the automobile 40, and signal lights on lateral sides of the automobile 40.

During operation, still referring to FIG. 3 the automobile 40 is operated by providing power to the wheels 46 with the combustion engine 58 and the electric motor 60 in an alternating manner and/or with the combustion engine 58 and the electric motor 60 simultaneously. In order to power the electric motor 60, direct current (DC) power is provided from the battery 52 to the inverter 54, which converts the DC power to AC power, prior to energizing the electric motor 60.

As alluded to previously, many operations (e.g., locking and unlocking the vehicle, activating and deactivating security systems, panic alarms, remote start, etc.) that may be initiated using the controls of an RF remote function activation transmitter (e.g., a keyfob of the type shown in FIG. 1) are confirmed by means of feedback confirmation annunciation signals (e.g., horn chirps, flashing lights, etc.). It was also pointed out that the type and/or intensity of the feedback signals are dependent solely on the selected function and are not influenced by ambient or environmental conditions, user preferences or the like.

Figure 4:
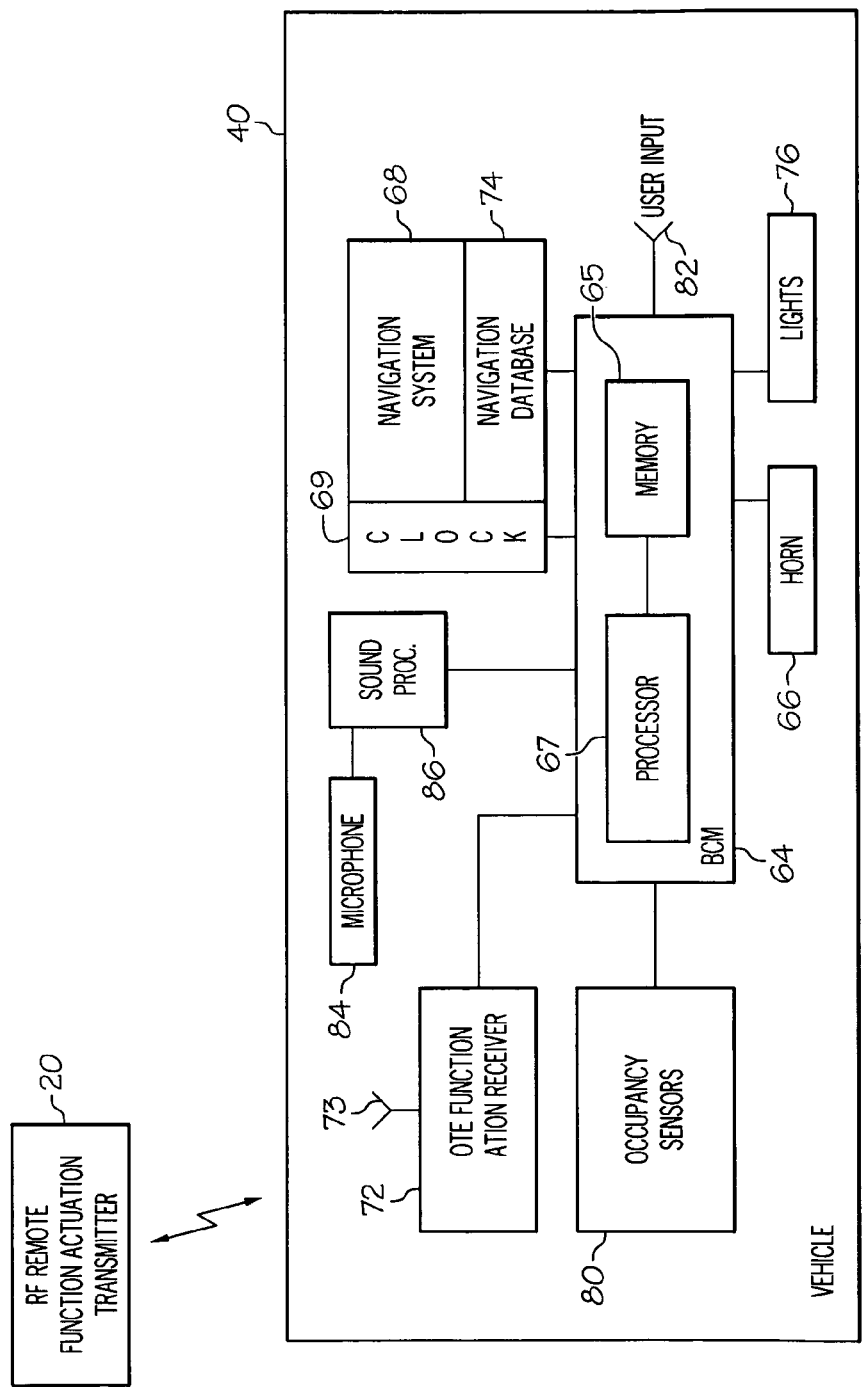
FIG. 4 is a block diagram of an exemplary system for modifying an RFA confirmation feedback signal in accordance with an exemplary embodiment.

FIG. 4 is a block diagram of an RFA audible verification system that alters and/or adjusts the feedback mode based on ambient or environmental conditions, user preferences, and the like including vehicle location, vehicle occupancy, and time of day or week, in accordance with a first exemplary embodiment. As will be appreciated, elements in FIG. 3 corresponding to elements in FIGS. 1 and 2 are denoted with like reference numerals.

Referring to FIG. 4, body control module (BCM) 64, comprises a memory 65 coupled to a processor 67. A navigation system 68 is coupled to BCM 64, as is clock 69. Annunciation devices such as a sound generator (e.g., horn 66) and lights 76 are likewise coupled to BCM 64 and are controlled thereby.

A user may activate a remote function of the type described above by means of RF remote function activation transmitter 20 (e.g., a keyfob) that wirelessly transmits an activation signal that is received at vehicle 40 by remote function activation receiver 72 via antenna 73. The output of receiver 72 is coupled to an input of BCM, which in turn, then commands horn 66 and/or lights 76 to generate an appropriate confirmation signal (e.g., flashing lights and/or one or more horn chirps). Data relating to the time of day, geographic location, and vehicle occupancy is provided to BCM 64 by clock 69, navigation system 68, and occupancy sensors 80, respectively. This data, in combination with a desired sound profile stored in BCM 64, may be utilized to tailor or adjust the feedback annunciations generated by horn 66 and/or lights 76.

The sound profile may be based on time and/or location. For example, a sound profile for a residence might include sound amplitude modes (1) Loud, (2) Normal, (3) Quiet, and (4) Silent assigned as follows: 8 AM to 8 PM—Normal or Loud, 8 PM to 10 PM—Quiet, 10 PM to 6 AM—Silent, and 6 AM to 8 AM—Quiet. In a similar manner, modes could be based on chirp frequency of the frequency of flashing lights. It may be determined that different annunciation modes would be desirable for hospital zones as distinguished from shopping mall parking lots. Additionally, it may be desirable to alter the magnitude, intensity, and/or the frequency of the feedback annunciation signal based on whether or not the vehicle 40 is occupied. For example, in the case of an audible alert, it may be desirable to generate a less aggressive feedback alert if the vehicle is occupied; e.g., a passenger is waiting in a vehicle in the shopping mall parking lot. To accomplish this, one or more occupancy sensors 80 located in the vehicle's seats are coupled to BCM 64 as shown in FIG. 4. This coupled with an appropriate annunciation profile will achieve the desired result.

Annunciation profiles can be constructed in BCM 64 by providing user preference data via a user input device 82. User input device may comprise a display/keypad assembly housed within vehicle 40. In addition to or alternatively, annunciation profiles may be constructed in BCM 64 or modified by means of the controls on remote function activation transmitter 20. Profiles may be constructed on computers and/or websites and subsequently transferred to BCM 64 in accordance with well-known techniques.

If desired, vehicle 40 and BCM 64 may be provided with user-prompting that is based on vehicle history. For example, BCM 64 may store a history of locations where the vehicle has been parked at night more than twenty-four hours within a three-day period utilizing information from clock 69 and navigation system 68. The system may then offer this location to the user as a home location and then associate this location with a predetermined annunciation profile. In a similar manner, a work location could be identified and associated with a different annunciation profile.

In addition to altering the nature of feedback confirmation annunciations using annunciation profiles based on time, location, occupancy, and the like, annunciation profiles may be selected based on ambient conditions. For example, a crowded, noisy parking lot may merit a confirmation feedback signal that is more intense (e.g., louder) than a residential driveway. Thus, still referring to FIG. 4, a microphone 84 or similar audio sensor device is coupled to a sound processor 86 that is in turn coupled to BCM 64. Sound processor 86 is configured to determine the level of ambient noise received by microphone 84. Processor 67 in BCM 64 may be configured to select a louder and/or more intense sound mode if the ambient noise exceeds a predetermined threshold in accordance with a desired annunciation profile.

Thus, there has been provided a remote function activation annunciation system that adjusts the confirmation feedback annunciation by establishing annunciation profiles that are based on ambient conditions, user preferences, vehicle locations, time of day, occupancy, and the like. Of course, the above description is given by way of example only, and changes in form and details may be made by one skilled in the art without departing from the scope of the invention as defined by the appended claims.

What is claimed is:

1. A system for generating a Remote-Function-Activation (RFA) confirmation signal at a vehicle, the system comprising: a vehicle RFA receiver; a user input device that receives user preferences; an annunciator that generates the confirmation signal; a processor coupled to the RFA receiver, the user input device, and the annunciator and configured to store an annunciation profile that includes the user preferences and characterizes the confirmation signal as a function of at least one condition, and cause the annunciator to generate the confirmation signal in accordance with the profile; and a remote function transmitter in the form of a keyfob configured to transmit the user preferences to the processor.

2. A system according to claim 1 wherein the at least one condition includes time-of-day and wherein the system further comprises a clock coupled to the processor.

3. A system according to claim 2 wherein the at least one condition includes vehicle location and wherein the system further comprises a navigation system coupled to the processor.

4. A system according to claim 1 wherein the at least one condition includes vehicle-occupancy and wherein the system further comprises an occupancy sensor coupled to the processor.

5. A system according to claim 1 wherein the at least one condition includes ambient noise and wherein the system further comprises a microphone coupled to the processor.

6. A system according to claim 5 wherein the annunciator is a sound generator.

7. A system according to claim 6 wherein the processor is further configured to cause the sound generator to produce an audible confirmation that increases in intensity with higher ambient noise.

* * * * *